United States Patent [19]

Bani-Hashemi

[11] Patent Number: 5,475,584
[45] Date of Patent: Dec. 12, 1995

[54] METHOD AND APPARATUS FOR ORIENTATING A CAMERA

[76] Inventor: Ali R. Bani-Hashemi, 14E Andover Cir., Princeton, N.J. 08540

[21] Appl. No.: 386,603

[22] Filed: Feb. 10, 1995

Related U.S. Application Data

[63] Continuation of Ser. No. 903,437, Jun. 24, 1992, abandoned.

[51] Int. Cl.[6] .................................................. G05B 19/18
[52] U.S. Cl. ...................... 364/167.01; 364/550; 364/559
[58] Field of Search ............................... 364/167.01, 516, 364/525, 550, 559; 358/101, 107, 209, 103, 903; 356/138, 152, 153, 363, 376; 250/561; 382/28, 42, 27, 65

[56] References Cited

U.S. PATENT DOCUMENTS

| | | | |
|---|---|---|---|
| 4,672,562 | 6/1987 | Egli et al. | 364/559 |
| 4,672,564 | 6/1987 | Egli et al. | 364/559 |
| 4,684,247 | 8/1987 | Hammill, III | 356/152 |
| 4,942,539 | 7/1990 | McGee et al. | 358/101 |
| 4,948,258 | 8/1990 | Laimi | 356/376 |
| 5,027,419 | 6/1991 | Davis | 382/28 |
| 5,051,906 | 9/1991 | Evans, Jr. et al. | 358/103 |
| 5,185,667 | 2/1993 | Zimmermann | 358/209 |

OTHER PUBLICATIONS

European Search Report, Application No. EP 93 10 8780, Dated Jul. 4, 1994.
Proceedings. 1992 IEEE International Conference on Robotics and Automation (Cat. No. 92CH3140-1), Nice, France, 12-14 May 1992, 1532-1538 vol. 2 ISBN 0-8186-2720-4 Ban-Hashemi A 'A Fourier approach to camera orientation'.
IEEE Trans. Pattern Anal. Mach. Intell. (USA), IEEE Transactions on Pattern Analysis and Machine Intelligence, Sep. 1988, USA, 10, 5, 713-720 ISSN 0162-8828 Lenz R K et al 'Techniques for calibration of the scale factor and image center for high accuracy 3-D machine vision metrology'.
WO-A-90 07096 (GMF Robotics Corp) 28 Jun. 1-20, 1990.

*Primary Examiner*—James P. Trammell

[57] ABSTRACT

A method for recovering orientation of a camera or other apparatus with respect to a coordinate system, where the orientation corresponds to a set of first, second, and third orientation vectors, comprises projecting onto an image plane respective first, second, and third images of first, second, and third gratings respectively formed on first, second, and third mutually orthogonal supporting planes and having respective first, second, and third wavelength vectors. The supporting planes are aligned with respective ones of the first, second, and third orientation vectors such that the wavelength vectors are in predetermined relationship with the orientation vectors. The first, second, and third images are associated with respective first, second, and third image wavelength vectors. Thereafter, the image wavelength vectors are measured; the wavelength vectors are derived therefrom; and the orientation vectors are thereby derived.

20 Claims, 7 Drawing Sheets

METHOD AND APPARATUS FOR ORIENTATING A CAMERA

CROSS-REFERENCE TO RELATED APPLICATION

This is a continuation of Ser. No. 07/903,437 filed Jun. 24, 1992 now abandoned.

Recovering camera orientation with respect to a calibration object is one of the basic problems in binocular stereo, photogrammetry, and docking. In binocular stereo, the determination of three-dimensional position and the orientation of features is very sensitive to the relative orientation between cameras.

A known technique for solving the camera orientation problem is by presenting a known pattern or object as a calibration object to the system and comparing the results with what is observed. Examples of camera calibration work can be found in Lenz et al. "Techniques for calibration of the scale factor and image center for high accuracy 3d machine vision metrology", Robotics Automation, Raleigh, N.C., USA, 1987, IEEE Intern. Conf.; R. Tsai, "A versatile camera calibration technique for high accuracy 3d machine vision metrology using off-the-shelf tv cameras and lenses", Technical Report RC11413, IBM Res., 1985; Tsai et al., "A new technique for fully autonomous and efficient 3d robotics hand/eye calibration", 4th Intern. Symp. Robotics Res., Santa Cruz, 1987; S. Ganapathy, "Decomposition of transformation matrices for robot vision" Int Conf on Robotics and Automation, 1984; and Caprile et al., "Using vanishing points for camera calibration" International Journal of Computer Vision, 1990.

There are many parameters to an imaging system, such as aspect-ratio or scaling of the imaging system, image center location, focal length of the lens, and lens distortion coefficients. These parameters are commonly referred to as the intrinsic camera parameters. Other parameters, such as camera position and orientation with respect to a known coordinate system are referred to as extrinsic camera parameters. More complex models for the camera can be introduced and, for example, these may allow the sensor plane to be at some angle with respect to the optical axis rather than being orthogonal thereto. The parameters mentioned above are commonly used in computer vision processing and more complex models are thereby avoided.

The complexity of the model required depends on the nature of the application. In some techniques many of these parameters are solved in a one-step attempt in the form of an optimization. See, for example, the afore-mentioned articles by Lentz et al., Tsai, Tsai et al., and Ganapathy. Other workers in the field have tried to decouple as many of these parameters as possible and determine them one at a time. See the afore-mentioned Caprile et al. document for an example of this type of technique.

For binocular stereo, the relative orientation and position between the stereo camera pair is particularly important. Determining the position and orientation of features in three-dimensional space is more sensitive to the relative orientation compared to the translation between the two cameras. A common technique for calibrating the relative position and orientation of the stereo pair camera is by determining the extrinsic parameters of each camera with respect to a common frame. Techniques which are commonly used are disclosed in the afore-mentioned articles by Lentz et al., Tsai, Tsai et al., and Ganapathy. The articles by B. Horn, "Relative orientation", International Journal of Computer Vision, 4. No. 1, January 1990, pp. 59–78; and B. Horn, "Relative Orientation revisited" Journal , of the Optical Society of America, 1991 describe a method by which the relative orientation between the cameras of a camera pair is calculated directly when both cameras look at a swarm of points.

In accordance with an aspect of the present invention, a method for determining the orientation of a camera relative to a calibration object utilizes the Fourier transform corresponding to the energy spectrum. Utilizing the Fourier transform combined with an orthographic projection decouples the relative orientation of the camera from its translational component. Accordingly, no feature extraction is used and the error associated with feature extraction is thereby avoided. The method permits the determination of the relative orientation of a camera with great accuracy.

In accordance with another aspect of the invention, a method for recovering an orientation vector of an object, comprises the steps of: projecting onto an image plane respective an image of a grating formed on a supporting plane and having a wavelength vector, the supporting plane being in a predetermined alignment relationship with the orientation vector such that the wavelength vector is in predetermined relationship with the orientation vector; measuring the image wavelength vector; deriving therefrom the wavelength vector; and thereby deriving the orientation vector.

In accordance with another aspect of the invention, the grating has a constant spatial frequency.

In accordance with yet another aspect of the invention, the grating represents a spatial sine-wave function.

In accordance with still another aspect of the invention, the grating represents a spatial square-wave function approximating a sine-wave function.

In accordance with a further aspect of the invention, a method for recovering orientation of a camera with respect to a coordinate system, the orientation corresponding to a set of first, second, and third orientation vectors, comprises the steps of: projecting onto an image plane respective first, second, and third images of first, second, and third gratings respectively formed on first, second, and third mutually orthogonal supporting planes and having respective first, second, and third wavelength vectors, the supporting planes being aligned with respective ones of the first, second, and third orientation vectors such that the wavelength vectors are in predetermined relationship with the orientation vectors, the first, second, and third images being associated with respective first, second, and third image wavelength vectors; measuring the image wavelength vectors; deriving therefrom the wavelength vectors; and thereby deriving the orientation vectors.

In accordance with yet a further aspect of the invention, the gratings have identical spatial frequencies such that the first, second, and third wavelength vectors are of identical wavelengths.

In accordance with still yet a further aspect of the invention, the step of deriving the wavelength vectors comprises solving in accordance with constraints wherein the image wavelength vectors are orthographic projections of the wavelength vectors, and wherein the wavelength vectors are of identical lengths and are mutually orthogonal.

In accordance with still yet a further aspect of the invention, the solving in accordance with constraints comprises forming a cost-function having a minimum satisfying the constraints.

In accordance with still yet a further aspect of the invention, the cost-function is formed by taking the squared sum of functions $f_1$ through $f_{12}$, as follows, wherein t's represent respective ones of the wavelength vectors and suffixes x, y, and z represent mutually orthogonal coordinate axes:

$$f_1(t1z,t2z,t3z) = |t_1| - |t_2|$$
$$f_2(t1z,t2z,t3z) = |t_2| - |t_3|$$
$$f_3(t1z,t2z,t3z) = |t_3| - |t_1|$$
$$|t_1| = t1x^2 + t1y^2 + t1z^2$$
$$|t_2| = t2x^2 + t2y^2 + t2z^2$$
$$|t_3| = t3x^2 + t3y^2 + t3z^2$$

$$f_4(t1z,t2z,t3z) = \frac{t1x}{|t_1|} \frac{t2y}{|t_2|} - \frac{t1y}{|t_1|} \frac{tx2}{|t_2|} - \frac{t3z}{|t_3|}$$

$$f_5(t1z,t2z,t3z) = \frac{t1z}{|t_1|} \frac{t2x}{|t_2|} - \frac{t1x}{|t_1|} \frac{t2z}{|t_2|} - \frac{t3y}{|t_3|}$$

$$f_6(t1z,t2z,t3z) = \frac{t1z}{|t_1|} \frac{t2y}{|t_2|} - \frac{t1y}{|t_1|} \frac{t2z}{|t_2|} - \frac{t3x}{|t_3|}$$

$$f_7(tz1,tz2,tz3) = \frac{t2x}{|t_2|} \frac{t3y}{|t_3|} - \frac{t2y}{|t_2|} \frac{t3x}{|t_3|} - \frac{t1z}{|t_1|}$$

$$f_8(t1z,t2z,t3z) = \frac{t2z}{|t_2|} \frac{t3x}{|t_3|} - \frac{t2x}{|t_2|} \frac{t3z}{|t_3|} - \frac{t1y}{|t_1|}$$

$$f_9(t1z,t2z,t3z) = \frac{t2y}{|t_2|} \frac{t3z}{|t_3|} - \frac{t2z}{|t_2|} \frac{t3y}{|t_3|} - \frac{t1x}{|t_1|}$$

$$f_{10}(t1z,t2z,t3z) = \frac{t1y}{|t_1|} \frac{t3x}{|t_3|} - \frac{t1x}{|t_1|} \frac{t3y}{|t_3|} - \frac{t2z}{|t_2|}$$

$$f_{11}(t1z,t2z,t3z) = \frac{t1x}{|t_1|} \frac{t3z}{|t_3|} - \frac{t1z}{|t_1|} \frac{t3x}{|t_3|} - \frac{t2y}{|t_2|}$$

$$f_{12}(t1z,t2z,t3z) = \frac{t1z}{|t_1|} \frac{t3y}{|t_3|} - \frac{t1y}{|t_1|} \frac{t3z}{|t_3|} - \frac{t2x}{|t_2|} ;$$

solving for a minimization of the cost function.

The invention will next be explained in greater detail with the aid of the drawing in which FIG. 1 shows the projection of a grating onto an image plane;

Figure 1:
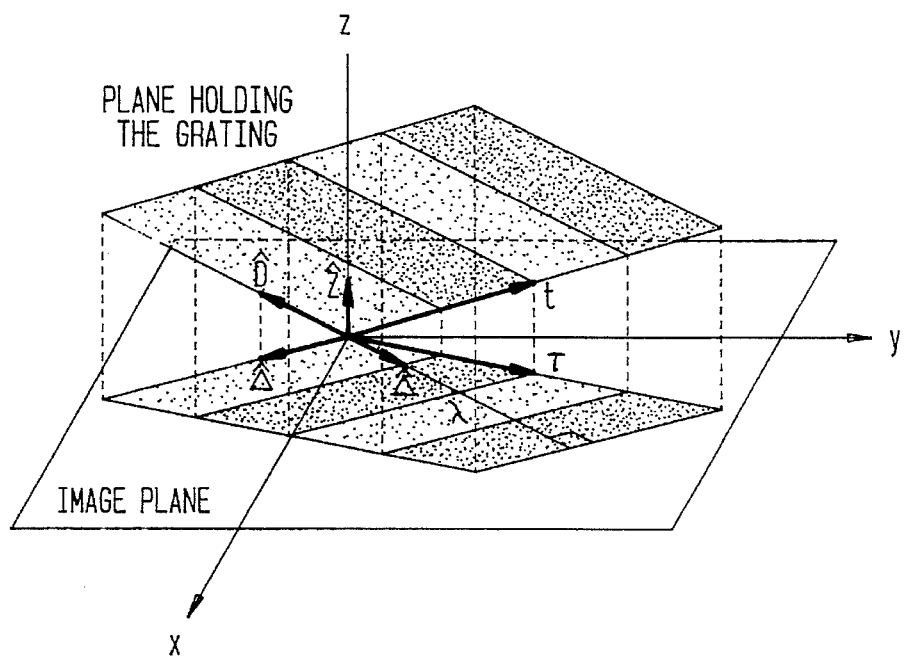

The principles for finding the orientation of a camera relative to a calibration object in accordance with the invention will first be explained with reference to FIG. 1. A camera coordinate frame, the "supporting frame" is defined centered at the image center with its x and y axes coinciding with that of the image plane and its z axis in the direction of optical axis.

Consider a sinusoidal grating supported by a plane in three-dimensional space. A line on the supporting plane is defined to be a line of constant-intensity if the points on the line have identical intensities. In FIG. 1 all the lines in the direction of unit vector D are lines of constant intensity. Such a grating may be represented by three quantities; (1) a wavelength vector t on the supporting plane whose direction gives the direction of the grating and whose length is representative to the wave-length of the sine wave; (2) a unit vector D, also in the supporting plane giving the direction of lines of constant-intensity; and (3) a scalar giving the magnitude of the sine wave. Naturally, the vectors t and D are orthogonal.

The orthographic projection of the grating onto the image plane is also a sinusoidal grating. Thus the projection illustration in FIG. 1. The lines of constant-intensity are projected to lines of constant intensity on the image plane. Projection of the unit vector D onto the image plane has a direction indicated by the unit vector δ. The unit vector δ reveals the direction of lines of constant intensity on the image plane.

Looking at the projection of the grating on the image plane, the wave-length vector α is perpendicular to δ and reveals the spatial frequency of the grating on the image plane. The projection of vector t, the wave-length vector of the grating on the supporting plane, onto the image plane is denoted by τ.

Suppose Z to be a unit vector in the direction of the z axis of the camera system. From FIG. 1 it is apparent that $$\delta = G \times X \qquad (1)$$

where G is a unit vector in the direction of α. From FIG. 1 it is also easy to see that τ is related to α as given by equation 2.

$$\alpha = (G \cdot \tau)G \qquad (2)$$

The sinusoidal grating on the image plane is represented by equation 3 where; p is a point on the image plane, α is the wavelength vector, and A is the amplitude of the sine wave.

$$g(p) = A\sin\left(2\pi \frac{G \cdot p}{\alpha}\right) = A\sin\left(2\pi \frac{\alpha \cdot p}{\alpha^2}\right) \qquad (3)$$

Figure 2:
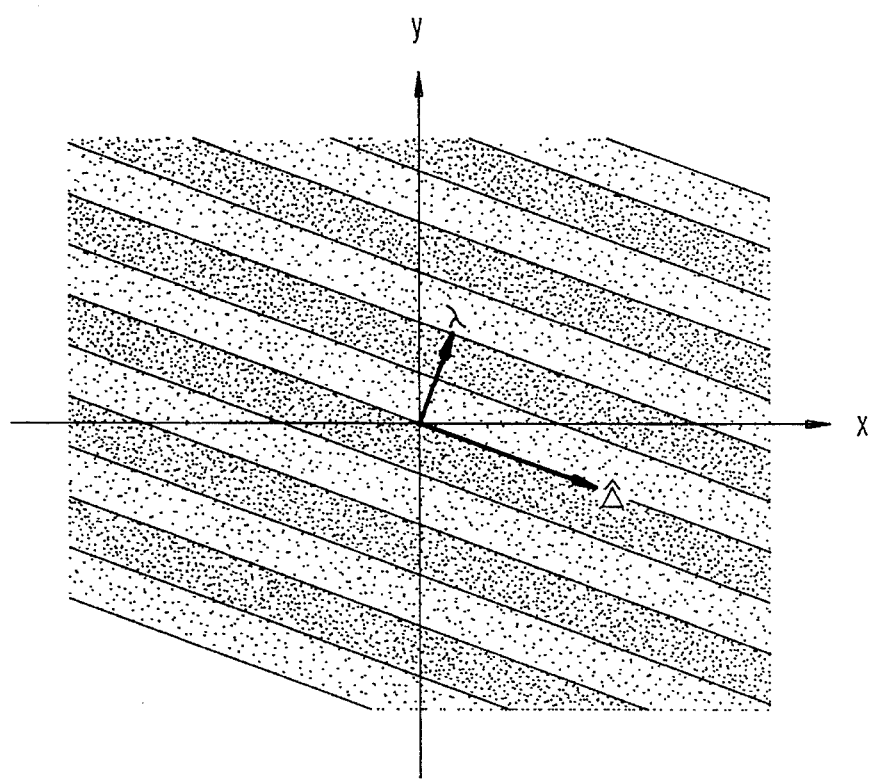
FIG. 2 shows a grating image.

FIG. 2 shows the function g(p) where δ is the unit vector in the direction of lines of constant intensity.

Figure 3:
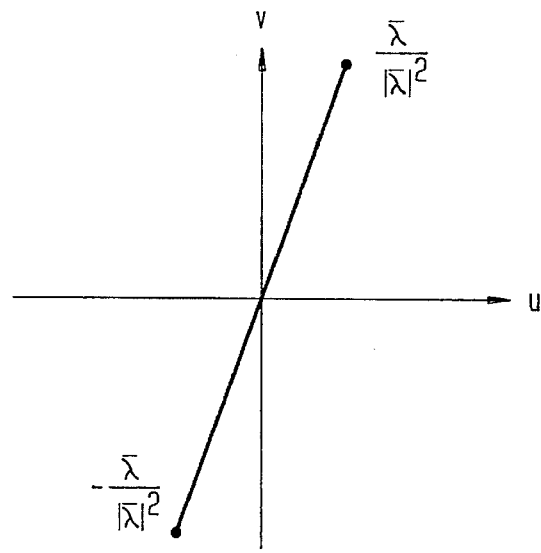
FIG. 3 shows the energy spectrum of the grating image.

The energy spectrum of this grating is G(P) where P is a point in the frequency domain. The energy spectrum of the sinusoidal grating is given by equation 4 and is illustrated in FIG. 3.

$$G(P) = \frac{A}{2} \delta\left(P - \frac{\alpha}{\alpha^2}\right) + \frac{A}{2} \delta\left(P + \frac{\alpha}{\alpha^2}\right) \qquad (4)$$

The energy spectrum exhibits two peaks, ideally two impulses, located at respectively $\alpha/\|\alpha\|^2$ and $\alpha/\|\alpha\|^2$. Note that $\alpha/\|\alpha\|^2$ is the reflection of the vector α with respect to a unit circle.

The analysis of the energy spectrum reveals a vector for the location of the peaks (e.i. $\alpha/\|\alpha\|^2$). The wavelength vector α is obtained by reflecting this vector with respect to the unit circle. Once α is determined, the direction of the lines constant intensity (δ) is obtained from equation 1.

Figure 4:
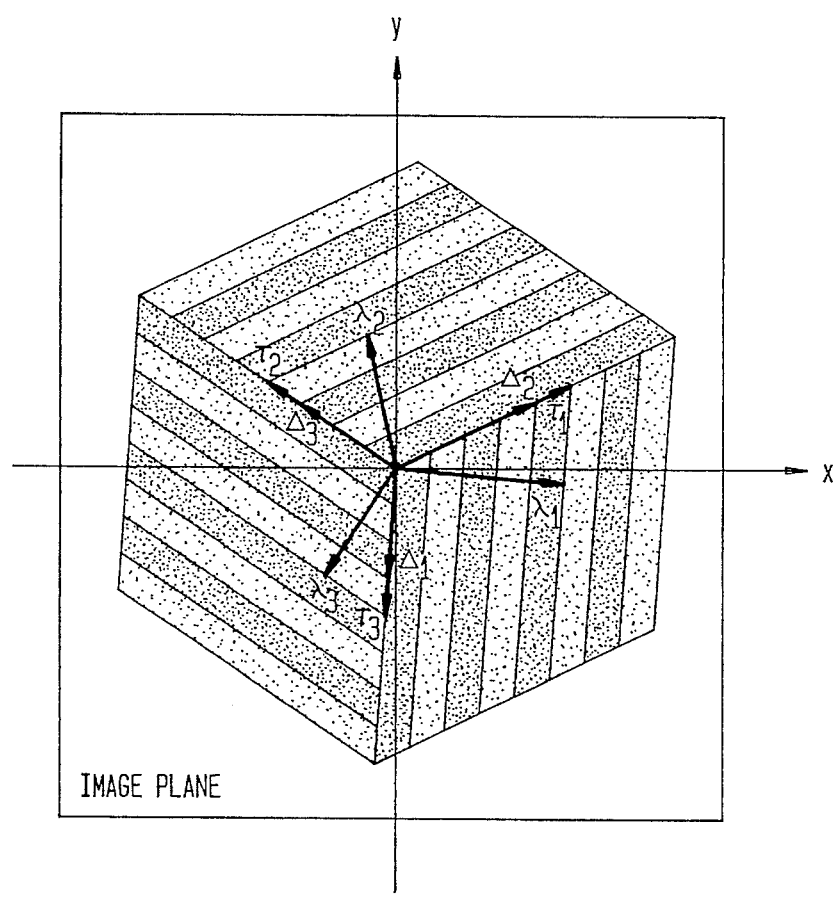
FIG. 4 shows the image of a calibration cube.

Considering next a more complicated situation where, instead of having one grating on a plane, there are three gratings on three planes mutually orthogonal to one another. Consider a calibration cube such that each grating is supported by one side of the cube with the wavelength vectors being mutually orthogonal. FIG. 4 illustrates the orthographic projection of such cube onto the image plane.

In FIG. 4, $\alpha_1$, $\alpha_2$, and $\alpha_3$ are the wavelength vectors associated with the gratings resulting from the orthographic projection of the cube onto the image plane. $\delta_1$, $\delta_2$, and $\delta_3$ are the directions of the lines of constant intensity associated with each of the gratings on the image plane. The relationships between $\delta_i$'s and $\alpha_i$'s are given in equation 1.

The construction of such a calibration cube shows an important property in that the direction of the lines of constant intensity on one plane coincides with the wavelength vector on another plane. This is seen in FIG. 4 wherein $\delta_1$ coincides with $\tau_3$, $\delta_2$ with $\tau_1$, and $\delta_3$ with $\tau_2$. This property allows the wavelength vectors on the image to be related to the wavelength vectors on the cube in three-dimensional space. By determining the direction of the wavelength vector on each side of the cube, the orientation of the cube with respect to a camera frame is determined.

Figure 5:
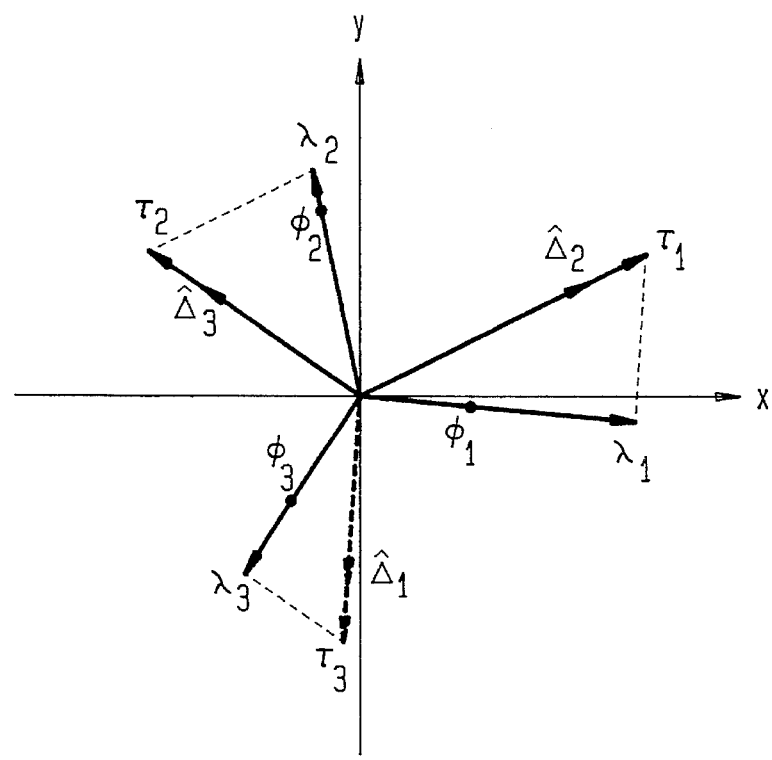
FIGS. 5 and 6 show diagrams helpful in gaining an understanding of the principles of the invention.

The wavelength vectors belonging to the gratings on the image plane are revealed by analyzing the energy spectrum of the image. The energy spectrum belonging to the image of the calibration cube will have distinct peaks associated with each grating. In FIG. 5, $\phi_1$, $\phi_2$, and $\phi_3$ are three vectors representing these peaks. The reflection of $\phi_i$'s with respect to the unit circle results in $\alpha_i$'s. $\tau_1$ which is the projection of the wavelength vector $t_1$ on the calibration cube is determined from ($\alpha_3$, $\alpha_1$) pairs respectively.

The problem has thus been reduced to the following. Given three vectors $\tau_1$, $\tau_2$, and $\tau_3$ find three corresponding wave-length vectors $t_1$, $t_2$, and $t_3$ on the calibration cube such that $\tau_i$'s are the orthographic projections of $t_i$'s; $t_i$'s have identical lengths, given that the gratings have identical spatial frequencies; and $t_i$'s are mutually orthogonal.

Figure 6:
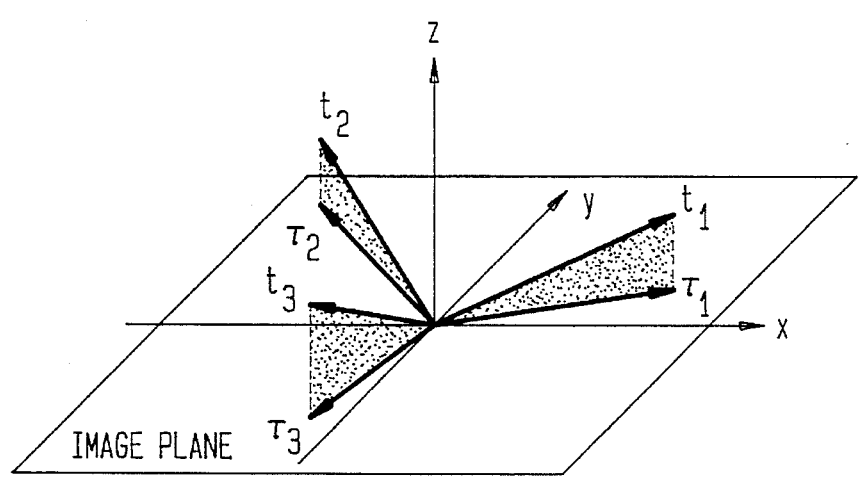

One approach to solving for $t_i$'s given $\tau_i$'s while satisfying the constraints mentioned above is an optimization. A cost-function is formed whose minimum corresponds to satisfying all the mentioned constraints. Considering a camera centered coordinate system as shown in FIG. 6, $\tau_i$'s are represented as $(\tau_{xi}, \tau_{yi}, 0)^T$. Representing $\tau_i$'s as $((\tau_{xi}, \tau_{yi}, t_{zi})^T$ satisfies the first constraint, that $\tau_i$'s are orthographic projections of $t_i$'s.

In equation 5, three functions $f_1$, $f_2$, and $f_3$ must all become zero to satisfy the second constraint. In this equation, $f_3$ is redundant since having $f_1$ and $f_2$ approaching zero implies that $f_3$ must also approach zero. The inclusion of $f_3$ in the optimization is to treat all vectors ($t_1$, $t_2$, and $t_3$) equally.

$$f_1(t1z, t2z, t3z) = |t_1| - |t_2|$$

$$f_2(t1z, t2z, t3z) = |t_2| - |t_3|$$

$$f_3(t1z, t2z, t3z) = |t_3| - |t_1| \qquad (5)$$

$$|t_1| = t1x^2 + t1y^2 + t1z^2$$

$$|t_2| = t2x^2 + t2y^2 + t2z^2$$

$$|t_3| = t3x^2 + t3y^2 + t3z^2$$

When $f_4$ through $f_{12}$ in equation 6 approach zero, the three vectors $t_1$, $t_2$, and $t_3$ become mutually orthogonal (satisfying the third constraint). Having $f_4$, $f_5$ and $f_6$ approach zero implies that $t_3/|t_3|$ is the cross product of $t_1/|t_1|$ and $$\frac{t_2}{|t_2|} \left( \frac{t_3}{|t_3|} = \frac{t_1}{|t_1|} \times \frac{t_2}{|t_2|} \right).$$

Similarly, $f_7$, $f_8$, and $f_9$ approaching zero implies that $t_3/|t_3|$ is the cross product of $t_2/|t_2|$ and $t_3/|t_3|$. $f_4$ through $f_9$ simultaneously approaching zero implies that $f_{10}$, $f_{11}$, and $f_{12}$ approach zero as well. Again, these are included in the formation of the cost function so all the vectors $t_i$'s are treated equally.

$$f_4(t1z,t2z,t3z) = \frac{t1x}{|t_1|} \frac{t2y}{|t_2|} - \frac{t1y}{|t_1|} \frac{tx2}{|t_2|} - \frac{t3z}{|t_3|} \qquad (6)$$

$$f_5(t1z,t2z,t3z) = \frac{t1z}{|t_1|} \frac{t2x}{|t_2|} - \frac{t1x}{|t_1|} \frac{t2z}{|t_2|} - \frac{t3y}{|t_3|}$$

$$f_6(t1z,t2z,t3z) = \frac{t1z}{|t_1|} \frac{t2y}{|t_2|} - \frac{t1y}{|t_1|} \frac{t2z}{|t_2|} - \frac{t3x}{|t_3|}$$

$$f_7(tz1,tz2,tz3) = \frac{t2x}{|t_2|} \frac{t3y}{|t_3|} - \frac{t2y}{|t_2|} \frac{t3x}{|t_3|} - \frac{t1z}{|t_1|}$$

$$f_8(t1z,t2z,t3z) = \frac{t2z}{|t_2|} \frac{t3x}{|t_3|} - \frac{t2x}{|t_2|} \frac{t3z}{|t_3|} - \frac{t1y}{|t_1|}$$

$$f_9(t1z,t2z,t3z) = \frac{t2y}{|t_2|} \frac{t3z}{|t_3|} - \frac{t2z}{|t_2|} \frac{t3y}{|t_3|} - \frac{t1x}{|t_1|}$$

$$f_{10}(t1z,t2z,t3z) = \frac{t1y}{|t_1|} \frac{t3x}{|t_3|} - \frac{t1x}{|t_1|} \frac{t3y}{|t_3|} - \frac{t2z}{|t_2|}$$

$$f_{11}(t1z,t2z,t3z) = \frac{t1x}{|t_1|} \frac{t3z}{|t_3|} - \frac{t1z}{|t_1|} \frac{t3x}{|t_3|} - \frac{t2y}{|t_2|}$$

$$f_{12}(t1z,t2z,t3z) = \frac{t1z}{|t_1|} \frac{t3y}{|t_3|} - \frac{t1y}{|t_1|} \frac{t3z}{|t_3|} - \frac{t2x}{|t_2|} \;;$$

When a cost function formed by taking the squared sum of all these functions approaches zero, it guarantees that every $f_i$ approaches zero. $c(t_{z1}, t_{z2}, t_{z3})$ shown in equation 7 is a very complex function of three variables $t_{z1}$, $t_{z2}$, and $t_{z3}$, however, its minimization has proved reliable and stable, as will be further explained below.

$$c(t1z, t2z, t3z) = \overset{2}{\underset{i=1}{\Sigma}} fi^2(t1z, t2z, t3z) \qquad (7)$$

Figure 7:
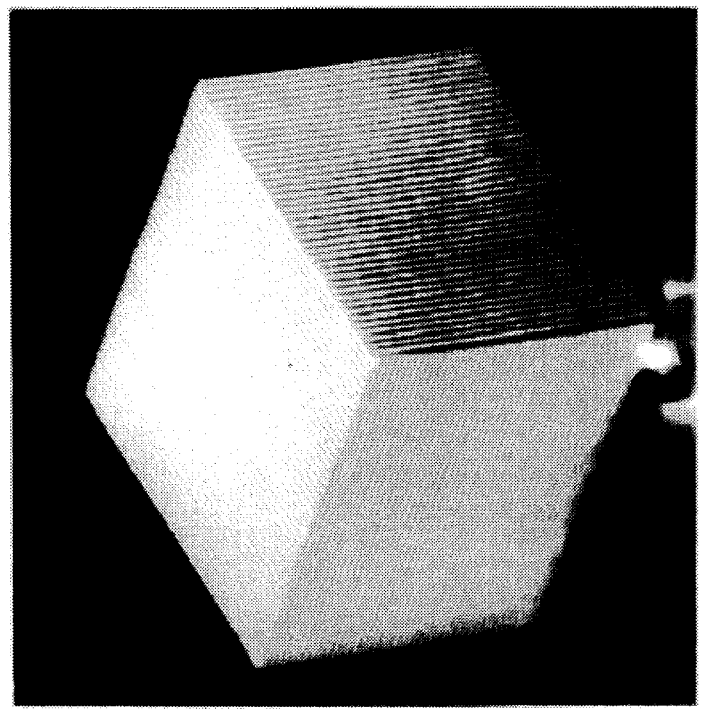
FIG. 7 shows an image of a calibration object.

Steps taken toward recovering the orientation of a camera with respect to a calibration object will next be described. A calibration object in the shape of a cube must be prepared with three gratings covering three sides of the cube. The direction of the gratings must be mutually orthogonal. The gratings should ideally be sinusoidal; however, black and white stripes are adequate, since the effect of their higher harmonics of a square wave may be ignored. FIG. 7 illustrates such a calibration object.

Figure 8:
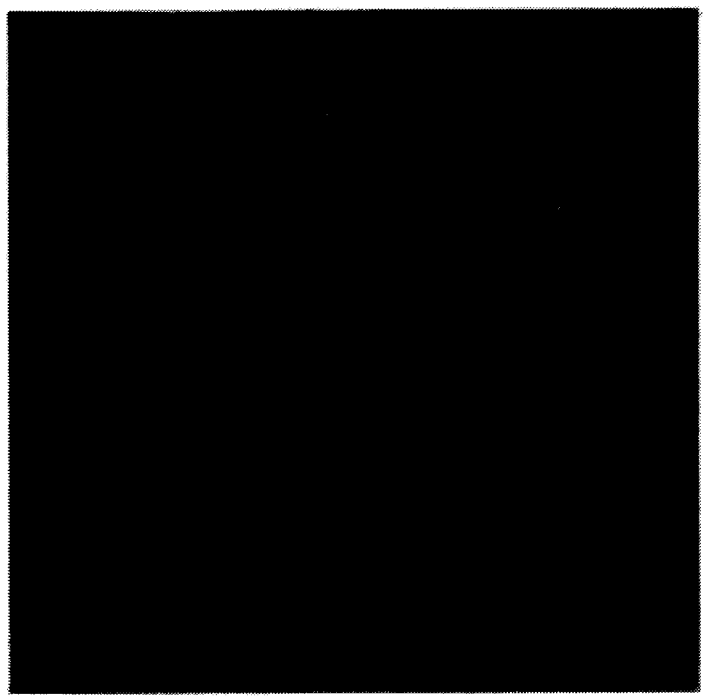
FIG. 8 shows an energy spectrum.

The energy spectrum of the calibration object consists mainly of three pairs of peaks, each pair being symmetrical with respect to the origin. FIG. 8 shows the energy spectrum of the calibration object shown in FIG. 7. In this figure a substantial peak associated with the DC signal has been filtered out. There are some other artifacts in the energy spectrum due to the background signal as well as aliasing. The gratings contain such high amounts of "energy" that the effect of these artifacts on the peaks is negligible.

The exact locations of the peaks are estimated by finding the centroid of the signal above a certain threshold. This reveals three pairs of points (six vectors). Three out of these six points must be selected, e.g. $\phi_1$, $\phi_2$, and $\phi_3$ in FIG. 5, such that the angle between any two points is greater than $\pi/2$. This permits two possibilities, that is, the camera orientation may be determined with an ambiguity. This ambiguity may be resolved by other techniques.

The reflection of $\phi_1$, $\phi_2$, and $\phi_3$ with respect to the unit circle results in $\alpha_1$, $\alpha_2$, and $\alpha_3$ respectively. $\alpha_i$'s in turn result in $t_i$'s as was explained above. Using equations 5 and 6, the vectors $t_1$, $t_2$, and $t_3$ then form the cost function expressed in equation 7. An optimization procedure disclosed in the publications R. Mead et al. "A simplex method for function minimization" Computer Journal, p. 308, vol. 7; 1991 and Hans-Paul Schwefel "Numerical Optimization of Computer Models" John Wiley and Sons; 1981, was used successfully to determine the minimum of the cost function. This procedure converges to the same minimum despite a large variety of initial points due to the nature of the cost function.

In an exemplary embodiment in accordance with the invention, utilized in an experimental analysis, a camera was mounted on a rotational stage. The camera was rotated about its optical axis and a calibration cube was mounted on a second rotational stage, such that the orientation of the camera was decoupled relative to the calibration object into two rotations. One rotation is the roll of the camera about its optical axis. The other is the rotation of the calibration object about an axis parallel to the image plane. Detecting and measuring the first type of rotation is the easier of the two since every rotation of the first stage corresponds to a similar rotation of the image. The second rotation is the more difficult to measure. Any other rotation can be considered as a combination of these two for which the performance of the system falls somewhere in between.

Figure 9:
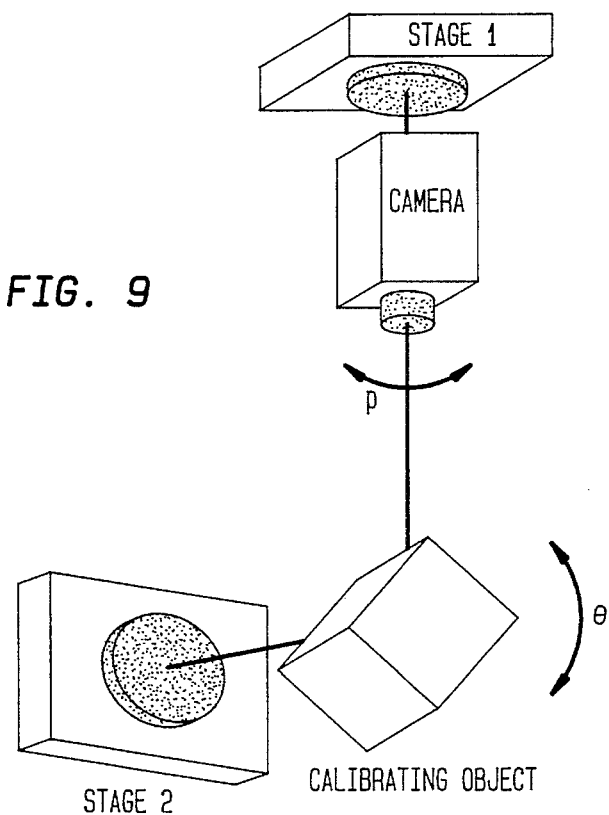
FIG. 9 shows a set-up of an experimental embodiment.

The axes of the two rotational stages are perpendicular. FIG. 9 shows the system, where angles a and e represent the roll angle of the camera and the rotation of the calibration object with respect to an axis parallel to the image plane, respectively. This technique assumes an orthographic projection model of the picture taking process. An orthographic projection is approximated by keeping the camera far from the object, and using a lens with a long focal length. For this experiment a Sony XC-57 camera was placed 150 centimeters away from the calibration object. A zoom lens was used with a focal length of 75 millimeters. The calibration cube is 4 centimeters on each side. The spatial frequency of the gratings is one cycle per millimeter.

Any rotation a of the first stage results in the same rotation of the image as long as the rotation is about an axis perpendicular to the image plane. If the camera optical axis and the rotational axis of the stage are not congruent, any rotation of the stage will have a translational component as well as a rotational component. The amount of rotation will be the same as the rotation of the stage, but the amount of translation will depend on how far off the two axes are. One characteristic of the Fourier transform is its insensitivity to translation. Therefore, it is not important for the optical axis of the camera to be congruent with the rotational axis. This simplifies the mechanical set-up. It is, however, important that the two rotational axes of the two stages be orthogonal, and that is determined by the mechanical fixtures. In the experimental setup, the rotational accuracy of the stages was 0.01 degrees.

In one experiment, the calibration object was rotated (the second stage) while keeping the role of the camera (angle $\sigma$) at a randomly selected constant value. In effect, the calibration object was rotated around a vector parallel to the image plane.

For this experiment a set of thirty angles was selected at random in the range of $-10$ to $+10$ degrees. For each new angle, the rotation stage was first moved to its home position, so that the random angles are all relative to the home position. For every relative position of the calibration object, an image was taken and processed, the orientation of the calibration object relative to the camera was calculated, and this orientation was compared with that of the calibration object being at the home position. In other words, the motion of the calibration object, consisting of rotation only, relative to its home position was calculated. This motion was represented by a unit quarternion giving the axis as well as the amount of rotation. Mathematical background material for the calculation is provided by, for example, Shuster Malcolm D. "Approximate algorithms for fast optimal attitude computation" AIAA pp 89–95; 1978 and Berthold K. P. Horn "Closed-form solution of absolute orientation using unit quaternions" Journal of the Optical Society of America, p. 629; April 1987.

Figure 10:
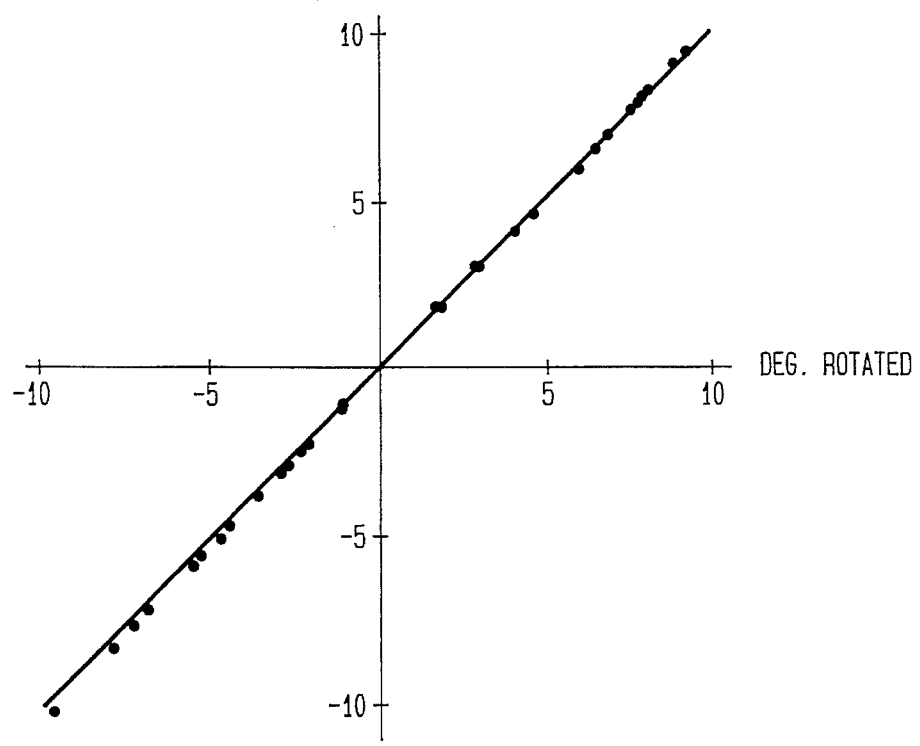
FIG. 10 shows an experimental response curve for random values of a parameter θ between {−10.0 and 10.0} degrees.
Figure 11:
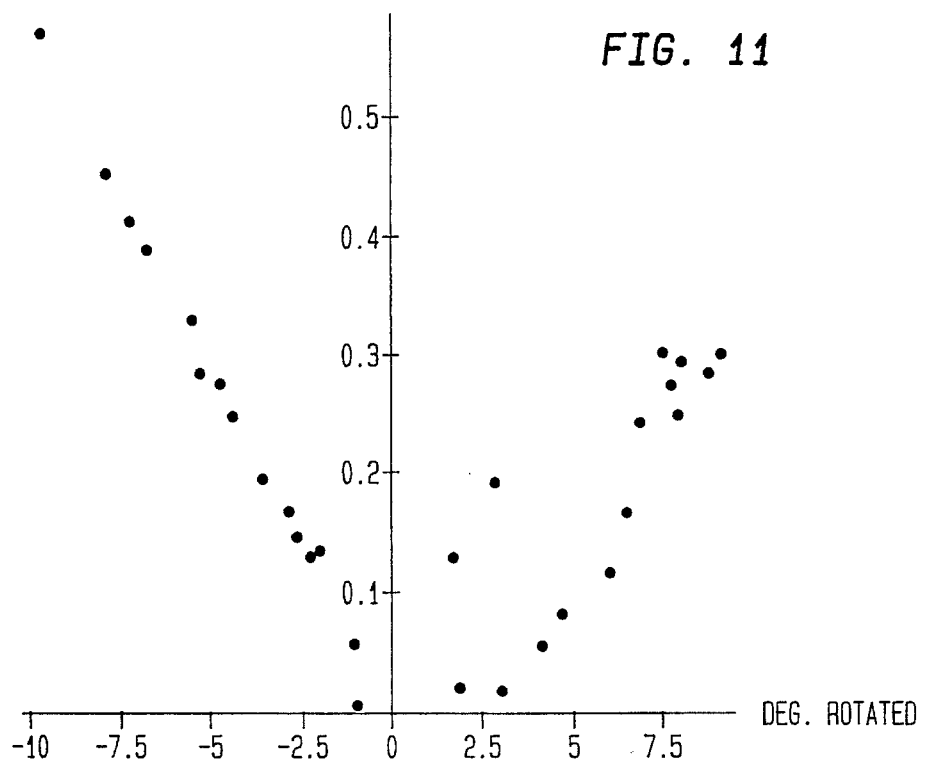
FIG. 11 shows experimental values of absolute error for random values parameter θ between {−10.0 and 10.0} degrees.

FIG. 10 illustrates the response of the system to different values of angle &74. Ideally all the points should fall on a straight line. The absolute error for different values of $\theta$ is illustrated in FIG. 11.

Figure 12:
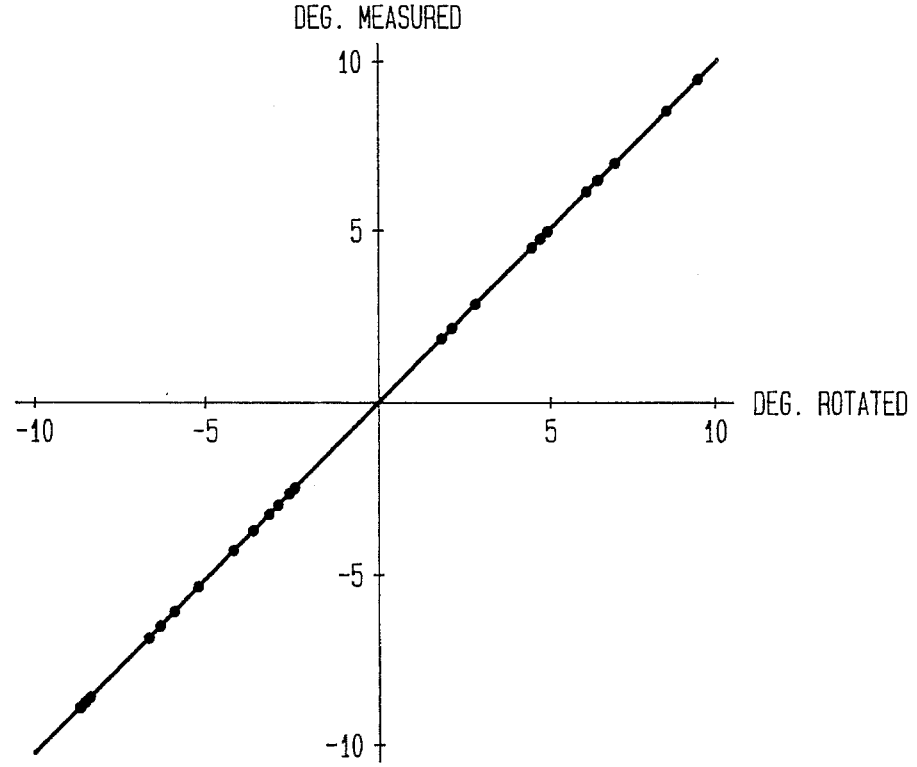
FIG. 12 shows an experimental response curve for random values of a parameter σ between {−10.0 and 10.0} degrees.
Figure 13:
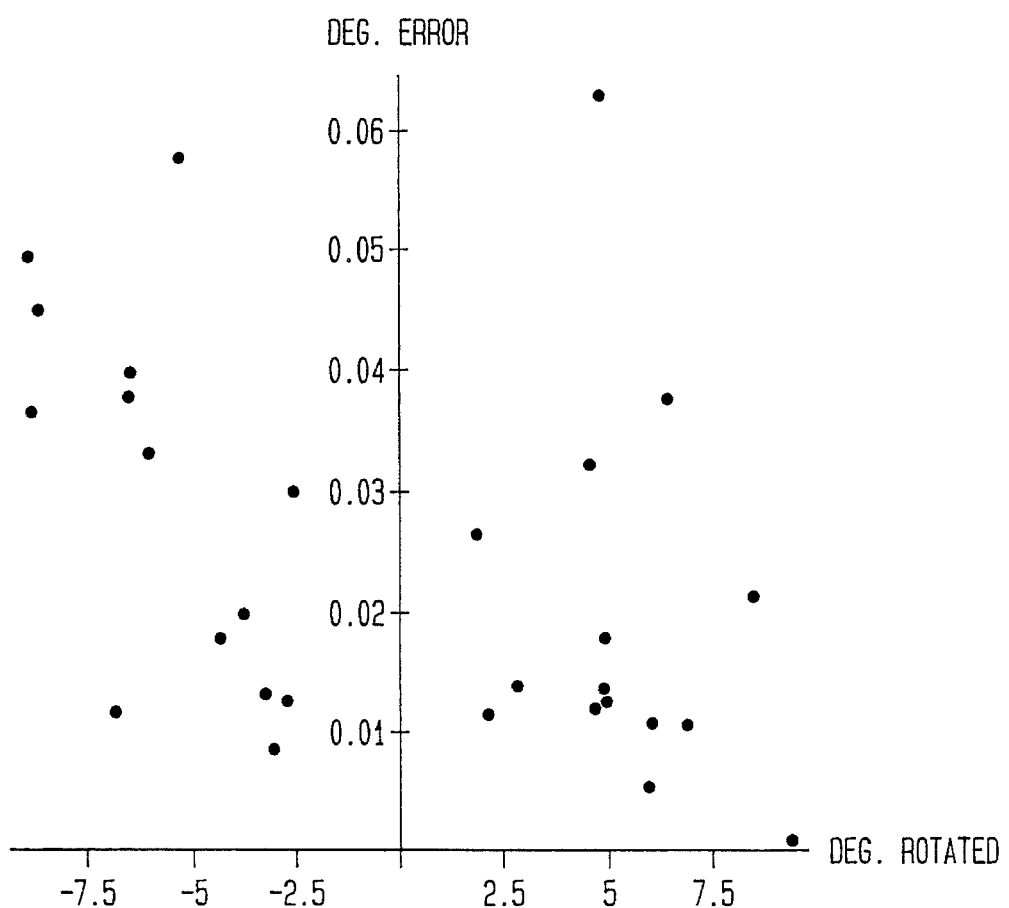
FIG. 13 shows experimental values of absolute error for random values of a parameter σ between {−10.0 and 10.0} degrees.

A similar experiment was performed by keeping $\theta$ at a randomly selected constant and changing a (the roll angle of the camera). A set of thirty camera roll angles a were again randomly selected between $-10$ and $+10$ degrees. The results are illustrated in FIGS. 12 and 13.

It should be noted that recovering the roll angle $\sigma$ is done with greater accuracy (as is apparent from the experiment) compared to the angle $\theta$. A quick observation based on the curves in FIGS. 10 and 11 suggests that the amount of error increases with the rotation angle. One possible explanation for this is the "orthographic projection" which is in reality a perspective projection and only approximately orthographic. In this case, as the calibration object rotates, different planes of the calibration cube get farther from or closer to the camera, thus changing the scale of the image.

The overall imaging system (camera and the image digitizer) may also contribute errors. By application of an accurate technique disclosed in the paper by Ali Bani-Hashemi "Finding the aspect-ratio of an imaging system" "Computer Vision and Pattern Recognition" IEEE Computer Society; 1991, for the combination of a Sony XC-57 camera and an Androx ICS-400 image digitizer, an aspect-ratio of 0.861 was calculated. The sensitivity of the results with respect to this number may be understood by considering a plane including a sinusoidal grating place in front of the camera such that the gratings appear as vertical bars. Let f denote the peak in the energy spectrum associated with the grating. This value must be corrected by the aspect-ratio before it enters any further calculations. Assume, e.g. $f1=0.861f$ is the corrected spatial frequency. If the aspect-ratio is calculated to be 0.860 instead of 0.861, being off by approximately 0.1 percent, this corresponds to the plane having an angle $Cos^{-1} 0.86/(0.861)=2.76$ degrees. This is a worst case situation, but it shows the strong effect that aspect-ratio has on the analysis. This problem is not limited to the technique utilized by the present invention; another method that relies on image data to calculate orientation will exhibit substantially the same sensitivity.

It should be noted that the resolution by which the energy spectrum is calculated (number of points in calculating FFT) has a direct impact on the accuracy of locating the peaks associated with the gratings. In the foregoing experiments a 512 point FFT was used to calculate the energy spectrum.

There has been described a procedure utilizing the energy spectrum of the image of a grating in three-space and relating that to the orientation of a plane holding the grating.

Once three gratings are placed on three sides of a calibration cube wherein the direction of gratings are mutually orthogonal, the orientation of the cube relative to the camera is accurately determined. A constraining factor associated with the present method is that orthographic projection has been assumed.

Orthographic projection is easily approximated by keeping the relative distance between the camera and the calibration object relatively far, and using a long focal length for the camera lens.

I claim:

1. A method for recovering an orientation vector of an object, comprising the steps of:

projecting onto an image plane an image of a grating formed on a supporting plane and having a wavelength vector, said supporting plane being in a predetermined alignment relationship with said orientation vector such that said wavelength vector is in predetermined relationship with said orientation vector;

measuring said image wavelength vector;

deriving therefrom said wavelength vector; and thereby deriving said orientation vector.

2. A method for recovering orientation of an object in accordance with claim 1, wherein said grating has a constant spatial frequency.

3. A method for recovering orientation of an object in accordance with claim 1, wherein said grating represents a spatial waveform of sine-wave function.

4. A method for recovering orientation of an object in accordance with claim 1, wherein said grating represents a spatial square-wave function, approximating a spatial sine-wave function.

5. A method for recovering orientation of apparatus with respect to a coordinate system, said orientation corresponding to a set of first, second, and third orientation vectors, comprising the steps of:

projecting onto an image plane respective first, second, and third images of first, second, and third gratings respectively formed on first, second, and third mutually orthogonal supporting planes and having respective first, second, and third wavelength vectors, said supporting planes being aligned with respective ones of said first, second, and third orientation vectors such that said wavelength vectors are in predetermined relationship with said orientation vectors, said first, second, and third images being associated with respective first, second, and third image wavelength vectors;

measuring said image wavelength vectors;

deriving therefrom said wavelength vectors; and thereby deriving said orientation vectors.

6. A method for recovering orientation of apparatus in accordance with claim 5, wherein said gratings have identical spatial frequencies such that said first, second, and third wavelength vectors are of identical lengths.

7. A method for recovering orientation of apparatus in accordance with claim 6, wherein the step of deriving said wavelength vectors comprises solving in accordance with constraints wherein said image wavelength vectors are orthographic projections of said wavelength vectors, and wherein said wavelength vectors are of identical lengths and are mutually orthogonal.

8. A method for recovering orientation of apparatus in accordance with claim 7, wherein said solving in accordance with constraints comprises forming a cost-function having a minimum satisfying said constraints.

9. A method for recovering orientation of a camera with respect to a coordinate system, said orientation corresponding to a set of first, second, and third orientation vectors, comprising the steps of:

projecting onto an image plane respective first, second, and third images of first, second, and third gratings respectively formed on first, second, and third mutually orthogonal supporting planes and having respective first, second, and third wavelength vectors, said supporting planes being aligned with respective ones of said first, second, and third orientation vectors such that said wavelength vectors are in predetermined relationship with said orientation vectors, said first, second, and third images being associated with respective first, second, and third image wavelength vectors;

measuring said image wavelength vectors;

deriving therefrom said wavelength vectors; and thereby deriving said orientation vectors.

10. A method for recovering orientation of apparatus in accordance with claim 9, wherein said gratings have identical spatial frequencies such that said first, second, and third wavelength vectors are of identical lengths.

11. A method for recovering orientation of apparatus in accordance with claim 10, wherein said gratings represent a spatial waveform approximating a sine-wave function.

12. A method for recovering orientation of apparatus in accordance with claim 10, wherein said gratings represent a spatial waveform approximating a square-wave function.

13. A method for recovering orientation of apparatus in accordance with claim 12, wherein the step of deriving said wavelength vectors comprises solving in accordance with constraints wherein said image wavelength vectors are orthographic projections of said wavelength vectors, and wherein said wavelength vectors are of identical lengths and are mutually orthogonal.

14. A method for recovering orientation of apparatus in accordance with claim 13, wherein said solving in accordance with constraints comprises forming a cost-function having a minimum satisfying said constraints.

15. A method for recovering orientation of apparatus in accordance with claim 14, wherein said cost-function is formed by taking the squared sum of functions $f_1$ through $f_{12}$, as follows, wherein t's represent respective ones of said wavelength vectors and suffixes x, y, and z represent mutually orthogonal coordinate axes:

$$f_1(t1z,t2z,t3z) = |t_1| - |t_2|$$
$$f_2(t1z,t2z,t3z) = |t_2| - |t_3|$$
$$f_3(t1z,t2z,t3z) = |t_3| - |t_1|$$
$$|t_1| = t1x^2 + t1y^2 + t1z^2$$
$$|t_2| = t2x^2 + t2y^2 + t2z^2$$
$$|t_3| = t3x^2 + t3y^2 + t3z^2$$

$$f_4(t1z,t2z,t3z) = \frac{t1x}{|t_1|} \frac{t2y}{|t_2|} - \frac{t1y}{|t_1|} \frac{tx2}{|t_2|} - \frac{t3z}{|t_3|}$$

$$f_5(t1z,t2z,t3z) = \frac{t1z}{|t_1|} \frac{t2x}{|t_2|} - \frac{t1x}{|t_1|} \frac{t2z}{|t_2|} - \frac{t3y}{|t_3|}$$

$$f_6(t1z,t2z,t3z) = \frac{t1z}{|t_1|} \frac{t2y}{|t_2|} - \frac{t1y}{|t_1|} \frac{t2z}{|t_2|} - \frac{t3x}{|t_3|}$$

$$f_7(tz1,tz2,tz3) = \frac{t2x}{|t_2|} \frac{t3y}{|t_3|} - \frac{t2y}{|t_2|} \frac{t3x}{|t_3|} - \frac{t1z}{|t_1|}$$

$$f_8(t1z,t2z,t3z) = \frac{t2z}{|t_2|} \frac{t3x}{|t_3|} - \frac{t2x}{|t_2|} \frac{t3z}{|t_3|} - \frac{t1y}{|t_1|}$$

$$f_9(t1z,t2z,t3z) = \frac{t2y}{|t_2|} \frac{t3z}{|t_3|} - \frac{t2z}{|t_2|} \frac{t3y}{|t_3|} - \frac{t1x}{|t_1|}$$

-continued $$f_{10}(t1z,t2z,t3z) = \frac{t1y}{|t_1|} \frac{t3x}{|t_3|} - \frac{t1x}{|t_1|} \frac{t3y}{|t_3|} - \frac{t2z}{|t_2|}$$

$$f_{11}(t1z,t2z,t3z) = \frac{t1x}{|t_1|} \frac{t3z}{|t_3|} - \frac{t1z}{|t_1|} \frac{t3x}{|t_3|} - \frac{t2y}{|t_2|}$$

$$f_{12}(t1z,t2z,t3z) = \frac{t1z}{|t_1|} \frac{t3y}{|t_3|} - \frac{t1y}{|t_1|} \frac{t3z}{|t_3|} - \frac{t2x}{|t_2|} ;$$

and solving for a minimization of said cost function.

16. Apparatus for recovering orientation of a camera with respect to a coordinate system, said orientation corresponding to a set of first, second, and third orientation vectors, comprising:

means for projecting onto an image plane respective first, second, and third images of first, second, and third gratings respectively formed on first, second, and third mutually orthogonal supporting planes and having respective first, second, and third wavelength vectors, said supporting planes being aligned with respective ones of said first, second, and third orientation vectors such that said wavelength vectors are in predetermined relationship with said orientation vectors, said first, second, and third images being associated with respective first, second, and third image wavelength vectors;

means for measuring said image wavelength vectors; and means for deriving therefrom said wavelength vectors so as to thereby derive said orientation vectors.

17. Apparatus for recovering orientation of a camera in accordance with claim 16, wherein said gratings have identical spatial frequencies such that said first, second, and third wavelength vectors are of identical lengths.

18. Apparatus for recovering orientation of a camera in accordance with claim 17, wherein said means for deriving said wavelength vectors comprises means for solving in accordance with constraints wherein said image wavelength vectors are orthographic projections of said wavelength vectors, and wherein said wavelength vectors are of identical lengths and are mutually orthogonal.

19. Apparatus for recovering orientation of a camera in accordance with claim 18, wherein said means for solving in accordance with constraints comprises means for forming a cost-function having a minimum satisfying said constraints.

20. Apparatus for orientating a camera in a desired orientation with respect to a coordinate system, said desired orientation corresponding to a set of first, second, and third orientation vectors, comprising:

means for projecting onto an image plane respective first, second, and third images of first, second, and third gratings respectively formed on first, second, and third mutually orthogonal supporting planes and having respective first, second, and third wavelength vectors, said supporting planes being aligned with respective ones of said first, second, and third orientation vectors such that said wavelength vectors are in predetermined relationship with said orientation vectors, said first, second, and third images being associated with respective first, second, and third image wavelength vectors;

means for measuring said image wavelength vectors;

means for deriving therefrom said wavelength vectors so as to thereby derive said orientation vectors; and means for utilizing said orientation vectors derived by said means for deriving for orienting said camera in accordance therewith.

\* \* \* \* \*

UNITED STATES PATENT AND TRADEMARK OFFICE
CERTIFICATE OF CORRECTION

PATENT NO. : 5,475,584
DATED : Dec. 12, 1995
INVENTOR(S) : Bani-Hashemi

It is certified that error appears in the above-indentified patent and that said Letters Patent is hereby corrected as shown below:

Cover Page
Following Item [76], please insert the following:

"[73] Assignee: Siemens Corporate Research, Inc., Princeton, NJ"

Signed and Sealed this

Twelfth Day of November, 1996

Attest:

BRUCE LEHMAN

*Attesting Officer*  *Commissioner of Patents and Trademarks*